Figure 1:
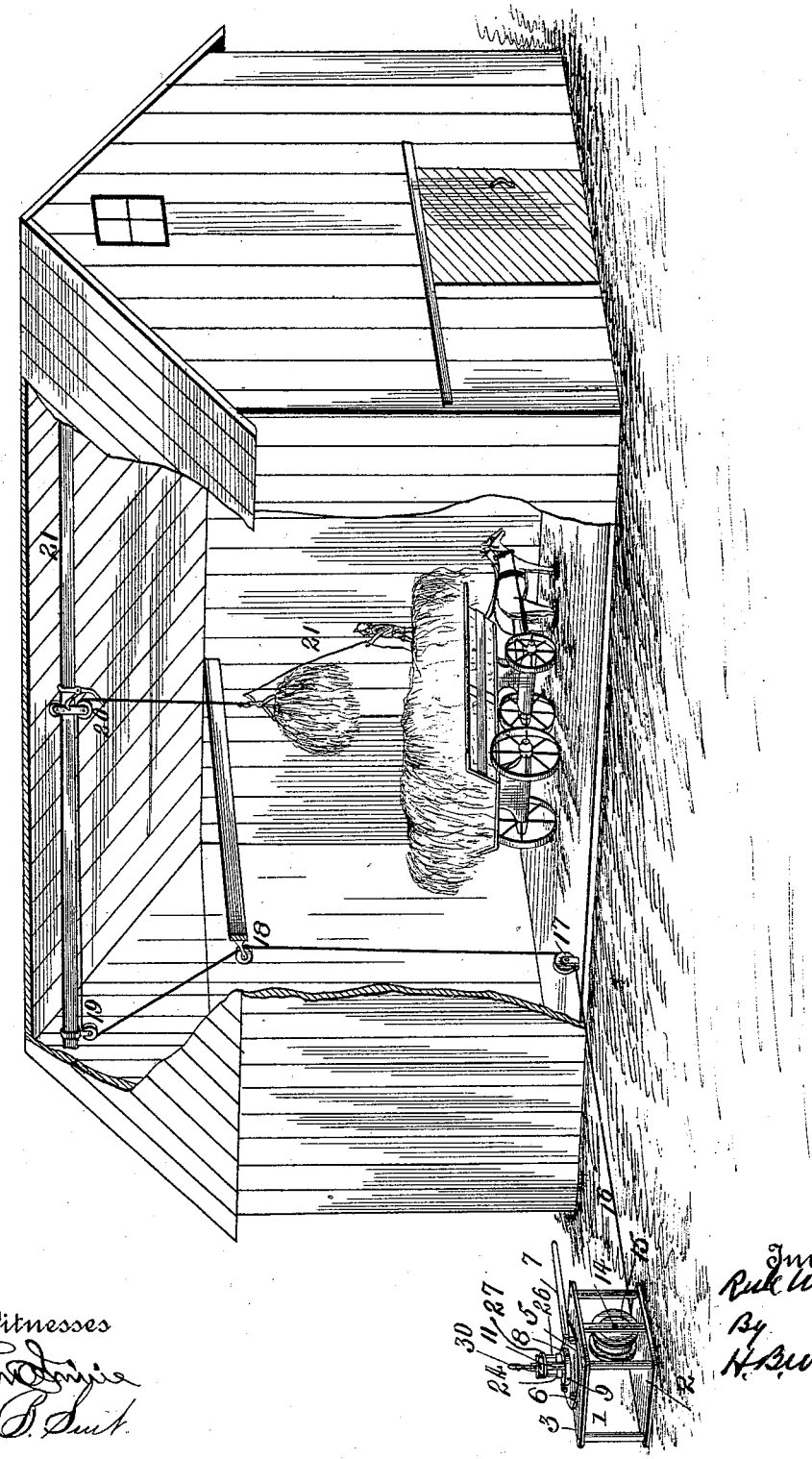

(No Model.)
2 Sheets—Sheet 1.

R. W. SAWYER.
HAY UNLOADER.

No. 537,995.   Patented Apr. 23, 1895.

Witnesses

Inventor (No Model.) 2 Sheets—Sheet 2.

R. W. SAWYER.
HAY UNLOADER.

No. 537,995. Patented Apr. 23, 1895.

Witnesses

Inventor
Rule W. Sawyer
By
H. B. Willson
Attorney

UNITED STATES PATENT OFFICE.

RULE W. SAWYER, OF WASHINGTON, DISTRICT OF COLUMBIA.

HAY-UNLOADER.

SPECIFICATION forming part of Letters Patent No. 537,995, dated April 23, 1895.

Application filed December 27, 1894. Serial No. 533,057. (No model.)

*To all whom it may concern:*

Be it known that I, RULE W. SAWYER, a citizen of the United States, residing at Washington, in the District of Columbia, have invented certain new and useful Improvements in Hay-Unloaders; and I do declare the following to be a full, clear, and exact description of the invention, such as will enable others skilled in the art to which it appertains to make and use the same.

My invention has relation to hay-unloaders, and among the objects in view is to provide a simple, strong and efficient unloading apparatus adapted to be operated by horse power for the purpose of unloading hay from a wagon in a quick and ready manner; and my invention consists in the novel construction, arrangement and combination of parts as hereinafter fully described, illustrated in the drawings and pointed out in the claims.

Figure 2:
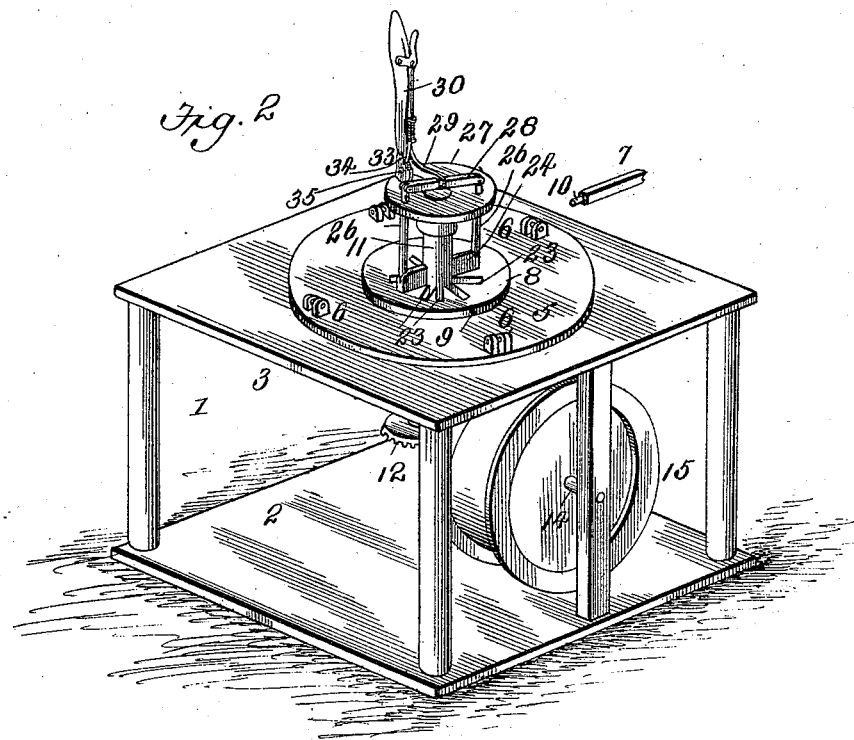
Figure 3:
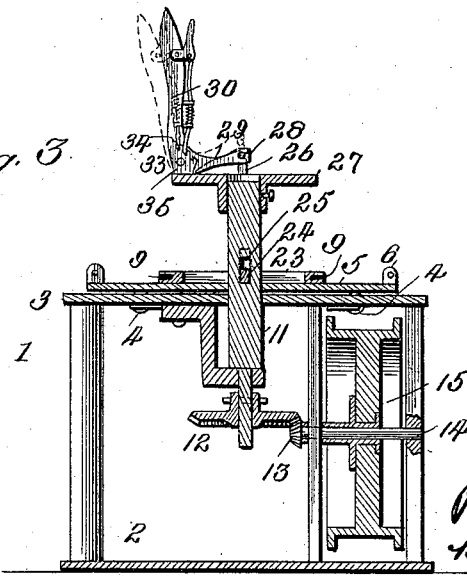

In the accompanying drawings, Figure 1 is a general perspective view illustrating my invention in use. Fig. 2 is an enlarged perspective view of the device. Fig. 3 is a vertical sectional view of the apparatus adapted to be driven or operated by horse power, and illustrating in dotted lines the position of the parts when it is desired to permit of the unwinding of the operating rope from the drum.

In carrying out my invention, I provide a rectangular framing 1, which I locate in proximity to a barn or other point where the hay is to be unloaded. Said framing is provided with the base 2 and table or platform 3, the latter being provided with suitable antifriction rollers 4. Arranged above the platform and adapted to be rotatably supported upon the rollers is a circular disk 5 provided adjacent to its circumferential edge with a number of clips or bearings 6, through which is adapted to be inserted a pole, such as indicated at 7, to which a horse may be attached for the purpose of rotating the disk. The disk is provided with a central raised portion 8 provided with apertures 9 to receive a tenon 10 on the inner end of the pole.

11 indicates a shaft passing loosely through the disk and the platform and carrying at its lower end a bevel wheel 12 which gears with a bevel pinion 13 on a horizontal shaft 14 carrying a large sheave or drum 15. To the latter is attached one end of a rope 16 which passes over a pulley 17 arranged adjacent to the barn floor, thence upwardly and over pulleys 18, 19 and 20 and carrying at the free end any suitable fork or lifting device for the hay, but preferably a device adapted to have its fingers or claws operated by a rope 21 to release the hay carried by the device, such as has been used heretofore.

The pulley 20 is held in a bearing adapted to travel along a horizontally arranged track 21 arranged near the roof of the barn, and which pulley is adapted to normally remain in the position indicated in Fig. 1, while the lifting fork or device is raising hay from the wagon until said device in its upward movement strikes against the catch holding the pulley and bearing and releases the latter to allow it to run along the track toward the pulley 19 which it will do as long as the drum is turning and winding the rope thereupon.

In order to throw the unloading device out of operation when the hay carried by the fork reaches a position over the point where it is to be dropped, and allow of the unwinding of the operating rope from the drum, I employ the following described means: 23 indicates radial slots or recesses in the platform and 24 is an arm working vertically in a slot 25 in the shaft 11 and adapted to enter said recesses. This arm is carried by vertical rods 26 which work loosely in openings in a plate or disk 27, secured to the upper end of the shaft 11. A cross head or bar 28 connects the upper ends of the rods 26, said bar being pivotally connected with one arm 29 of a bell crank lever 30 pivotally mounted upon the plate 27, the other arm of said lever being extended upwardly to form an operating handle. When the arm 24 is in its lowered position indicated in Figs. 2 and 3 and engages two of the slots 23, and the horse is turning the disk 5, the shaft 11 will be rotated which will, through the medium of the bevel gearing, effect the rotation of the drum and thus wind the rope on the same whereby the elevating or lifting device grasping a portion of the hay from the wagon will be elevated until it strikes the catch device of the pulley 20 and releases the latter which then travels along the track toward the pulley 19 and when over the point to be deposited, the operator (who is stationed on the disk 5) throws the bell crank lever into the position seen in dotted lines in Fig. 3, which thus draws the arms 24 out of the slots thus throwing the shaft 11 out of operation and stopping the rotation of the drum. A person within the barn then draws upon the rope 21 to cause the fingers of the lifting device to release the hay. By continuing to draw upon the rope 21, the pulley 20 will be drawn back into its normal position, the rope 16 at the same time unwinding from the drum, after which the lifting device will be caused to take up more of the hay, the arm 24 thrown back into engagement with the slots and the horse made to continue his walk around the device to again effect the raising of the hay, and so on until all the hay has been transferred from the wagon to the point of deposit.

For holding the bell crank lever in its locking and unlocking positions, any suitable spring operated dog or catch device as indicated at 33 may be employed, adapted to engage with one or the other of the notches or openings 34 in a standard 35 carried by the disk.

Although I have described my device as being used for unloading hay, it will be obvious that it may be used for unloading other materials.

What I claim, and desire to secure by Letters Patent, is—

1. In an unloading apparatus, the combination with a supporting frame having a platform, the latter having radial slots, antifriction rollers carried by said platform and projecting upwardly therethrough, a circular disk rotatably supported upon said rollers, a bearing on said disk adapted to receive one end of a pole, a central vertical shaft extending loosely through the disk and platform, a bevel wheel on the lower end of the shaft, a horizontal shaft journaled in the frame and a bevel pinion on said shaft gearing with the bevel wheel, a sheave or drum on the horizontal shaft, a rope attached at one end to the sheave, a lifting device attached to the opposite end of the rope, an arm working vertically in a slot in the central vertical shaft and adapted to engage with the radial slots, a plate or disk secured to the upper end of said central shaft, vertical rods carrying the said arm and working loosely in said disk, a cross head connecting the rods, a bell-crank lever pivoted to the said plate or disk and to which lever, said bar is pivoted, all as and for the purpose specified.

2. In an unloading apparatus, the combination with a supporting frame having a platform, the latter having radial slots, a disk rotatably mounted on the platform, a bearing on said disk adapted to receive a pole, a central vertical shaft extending loosely through the disk and platform, a bevel wheel on the lower end of the shaft, a horizontal shaft journaled in the frame, a bevel pinion on the latter shaft and gearing with the bevel wheel, a sheave or drum on the horizontal shaft, a rope attached at one end to the sheave, a lifting device attached to the opposite end of the rope and adapted to be operated to release the material as described, a pulley over which said rope passes, a horizontal track, a bearing carrying said pulley horizontally movable on said track, and adapted to be temporarily held in a fixed position upon the track and to be released by the lifting device when the same is elevated as described, an arm working vertically in a slot in the central vertical shaft and adapted to engage with the radial slots, a plate or disk secured to the upper end of said central shaft, vertical rods carrying the said arm and working loosely in said disk, a cross-head connecting the rods, a bell-crank lever pivoted to the said plate or disk and to which lever said cross-head is pivoted, all as and for the purpose specified.

In testimony whereof I affix my signature in presence of two witnesses.

RULE W. SAWYER.

Witnesses:
A. B. SUIT,
ROSIE HERZOG.